INVENTORS
JOHN J. LENTZ
ROBERT R. SEEBER, JR.
BY Marshall M. Truex
ATTORNEY

Jan. 18, 1966 J. J. LENTZ ETAL 3,230,511

TAG ADDRESSED MEMORY

Filed April 30, 1959 4 Sheets-Sheet 2

TAG ADDRESSED MEMORY

Filed April 30, 1959 4 Sheets-Sheet 4

United States Patent Office 3,230,511

Patented Jan. 18, 1966

3,230,511

TAG ADDRESSED MEMORY

John J. Lentz, Chappaqua, and Robert R. Seeber, Jr., Poughkeepsie, N.Y., assignors to International Business Machines Corporation, New York, N.Y., a corporation of New York Filed Apr. 30, 1959, Ser. No. 809,987
18 Claims. (Cl. 340—172.5)

This invention relates to associative memory apparatus and more particularly to an improved tag addressed memory system including comparison, indicating, and control circuits useable in such systems.

An associative memory is a memory in which the data record is retrieved by specifying the information content of an arbitrary pattern of the structure. The associative region, or that portion of the record possessing associative properties, may extend over the entire record or only a part of it as determined by construction. A tag addressed memory is a memory in which the data record is retrieved by specifying the total information content of a specific section of the record as predetermined by construction. This section is designated as the tag. Many of tag addressed memories depending upon whether the other memory concepts can be shown to be subclasses tag and data are fixed or variable. In this embodiment of the invention the tag and data are fixed and examples of this subclass are catalog, table look-up, and implicit memories.

One well known method of addressing memory involves operation with a memory address definitely associated with the physical location of a particular word in memory. This manner of memory reference involves considerable difficulty in programming particularly where addresses require modification during successive cycles of a program loop. In the development of automatic programming procedures one of the devices that simplifies the programmer's problem is the use of tag addresses for reference to memory instead of giving a precisely defined location. The automatic program then performs manipuations to transfer this tag address into the machine language form of fixed address mentioned above. Programming is much simplified in the type of tag addressing herein provided as part of the machine structure.

An article by D. A. Buck entitled "The Cryotron, a Superconductive Computer Element" which appeared in the April 1956 issue of the Proceedings of the IRE, pages 482 through 493, includes a summary of the theory of superconductivity and cites a number of publications relating to the subject. This article is directed to a discussion of superconductive circuits such as might be used in computer applications and proposes a basic switching or gating element for such circuits designated a Cryotron, which comprises a gate conductor of a superconductive material around which is wound a control coil. The control coil is preferably fabricated of a superconductive material requiring a more intense magnetic field to drive it into a normal or resistive state at the operating temperature of the circuit than is required to so drive the superconductive material of the gate conductor. Cooling apparatus is provided for maintaining both the gate and coil below the temperatures at which the superconductive materials of which they are fabricated undergo transitions between normal and superconductive states in the absence of a magnetic field. The gating function is achieved by energizing the control coil with sufficient current to render it effective to apply to the gate conductor a magnetic field of sufficient intensity to cause the gate conductor to assume the resistive state.

Another article entitled "A Cryotron Catalog Memory System" appeared on pages 115 through 119 of the Proceedings of the Eastern Joint Computer Conference held in December of 1956, which was published by the American Institute of Electrical Engineers in 1957. The catalog memory system described in this article is constructed using storage elements of cryotron trigger circuits. These trigger circuits are arranged in columns and rows, and in operation each row of the memory is used to store the binary values of the single information word. Each of the trigger circuits in the memory is provided with a comparison circuit and the memory is interrogated by applying to these circuits pulses representative of a particular word.

In the present invention, words are separated into two parts, the tag and the data, although this restriction is not necessarily required for the tag address type of memory since the tag may be a selected portion of the data word. An entry register and an exit register connect with channels going to other parts of the system for tag and data reception and transmission, and the computing or information utilization system supplies instructions for entry and exit of words and provides appropriate timing signals. A plurtlity of cryogenic storage registers are provided in rows between the entry and the exit registers. One portion of each storage register is designated a tag portion and each of the storage devices therein is provided with a compare circuit. Another portion is designated the vacancy portion; and another portion of each storage register is the data portion. For entry of the word in memory, the word is placed in the entry register and then transferred into the first vacant location in memory. The memory is interrogated by applying to the compare circuits of the tag portion pulses representative of a particular tag, and if that tag is present in the memory, an indication is obtained and the corresponding word is read out of the word register into the exit register. Whenever the capacity of memory is reached, a no-vacancy signal is derived which may be used to initiate other operations such as to transfer to another memory. With this arrangement it becomes apparent that every location of the tag addressed memory may be utilized.

It is an object of the present invention to provide an improved tag addressed memory.

Another object is to provide an improved catalog or associative cryogenic memory system.

A further object is to provide a system of the associative memory type having novel compare and control devices for utilizing such a memory.

Another object of the invention is to provide a tag addressed type memory wherein circuits are arranged to enter data into memory sequentially.

Still another object of this invention is to provide control circuits for giving an indication when all locations in memory are storing information.

Another object is to provide apparatus for selecting a location in a storage system.

Another object of the invention is to provide vacancy indicators for locations of storage which may be altered in the process of using storage.

Another object of the invention is to provide means for altering the tag within a unit of information.

Another object of the invention is to furnish means for changing the vacancy indicator to control a subsequent operation.

Still another object of the invention is to provide a steering circuit for selecting a storage location according to vacancy information.

Yet another object of this invention is to provide apparatus for determining the availability of a storage location, apparatus for entering data therein, and devices for retrieving data on the basis of its information content.

The foregoing and other objects, features and advantages of the invention will be apparent from the following more particular description of a preferred embodiment of the invention, as illustrated in the accompanying drawings.

Figure 1A:
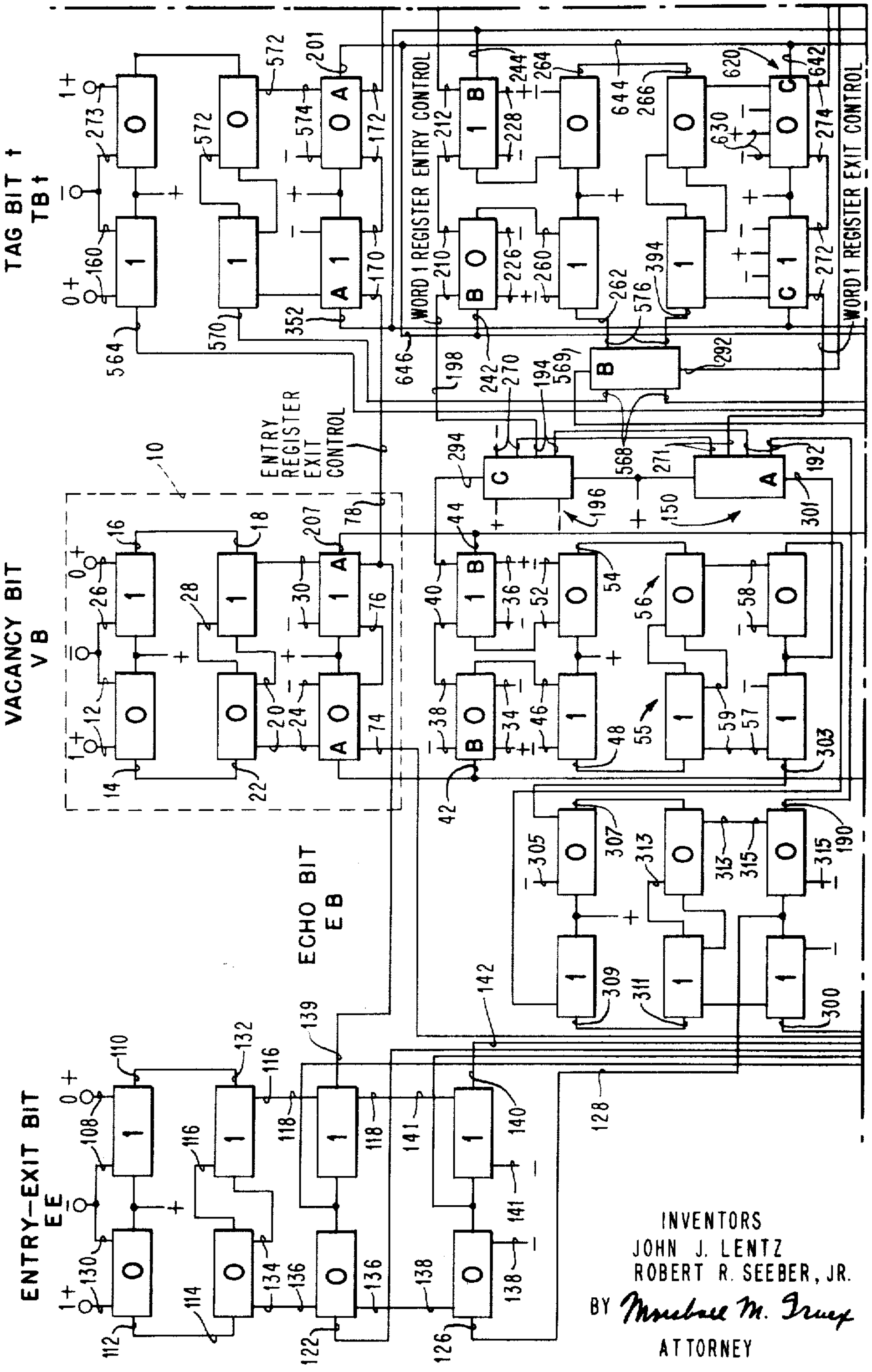
FIGURES 1A through 1D are a circuit diagram of the Tag Addressed Memory.
Figures 1B, 2, 3:
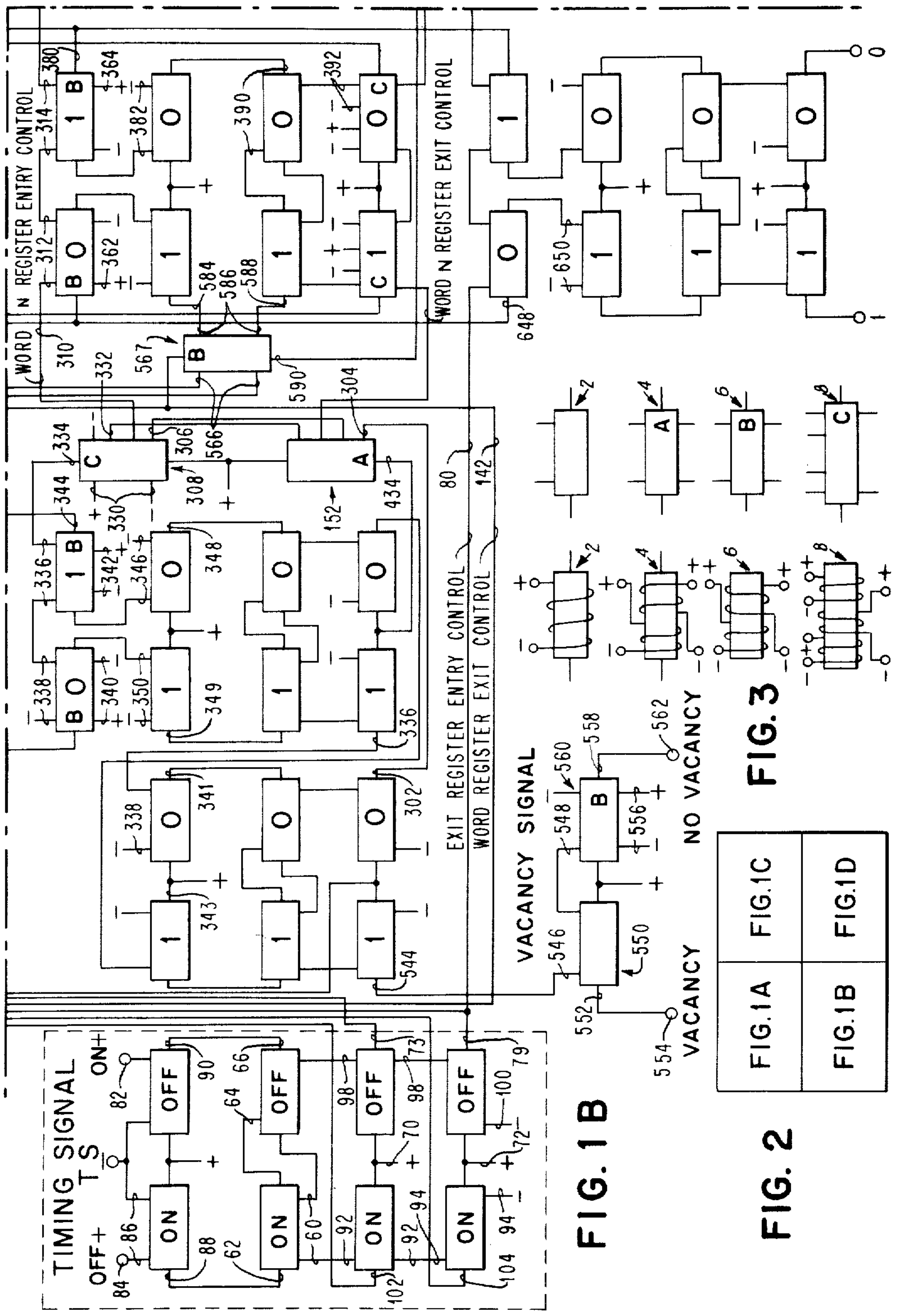
FIGURE 2 illustrates the arrangement of FIGURES 1A through 1D to form a composite diagram.
FIGURE 3 is an illustration of four cryogenic logical devices with corresponding block diagrams.
Figure 1C:
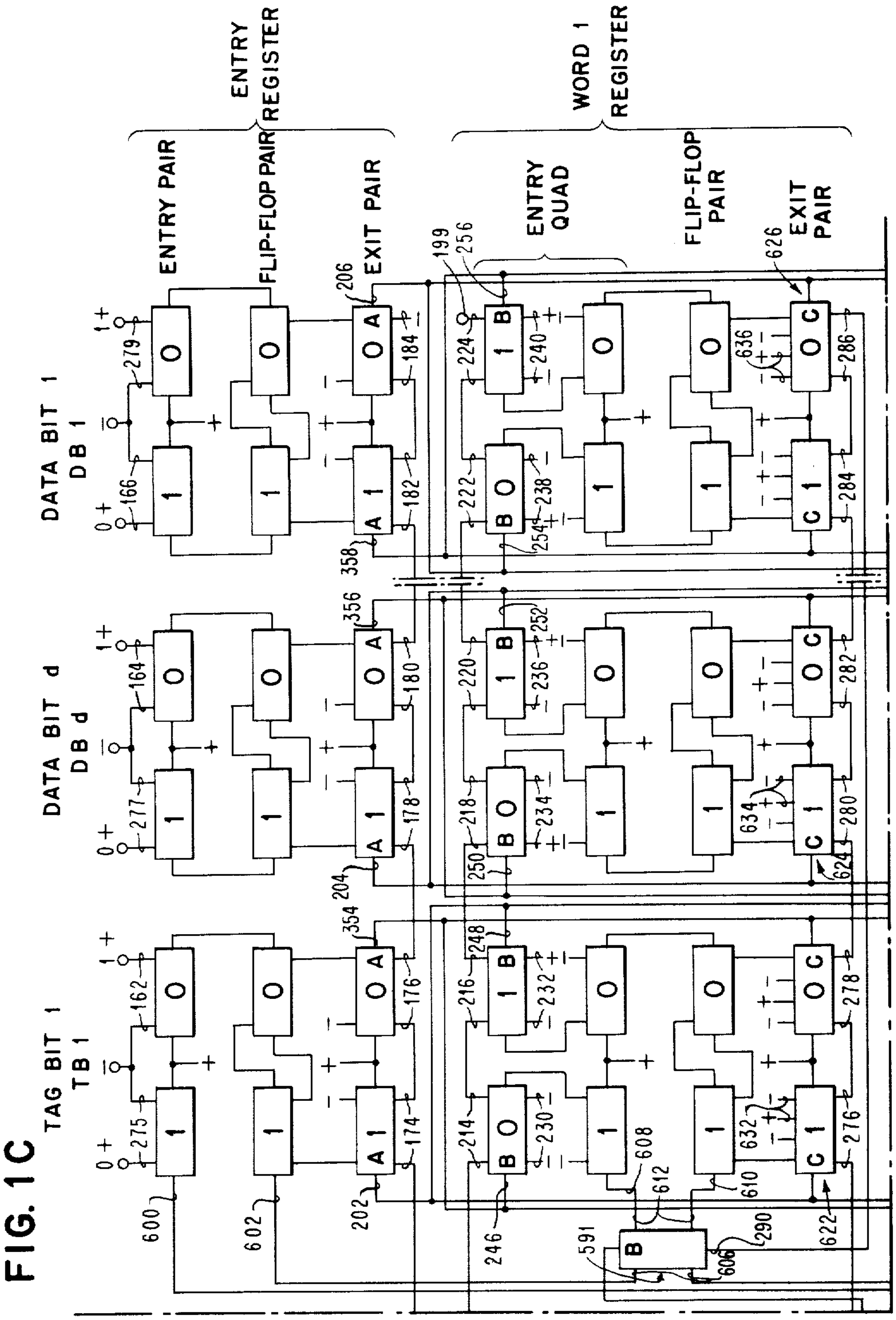
Figure 1D:
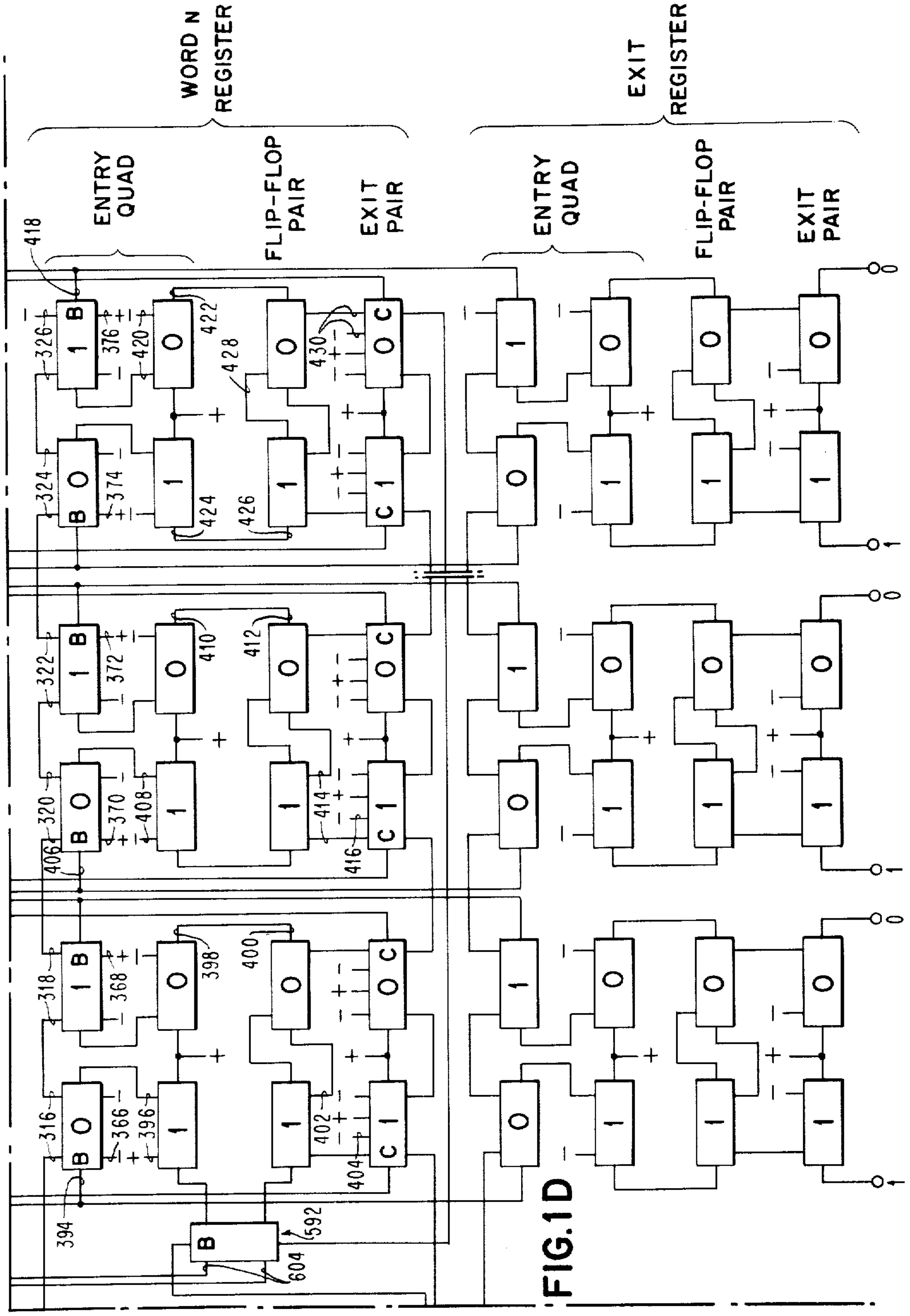

FIGURES 1A through 1D, when arranged as shown in FIGURE 2, form the circuits of the Memory system of the present invention in which four types of cryogenic logical circuits are employed. Referring to FIGURE 3, the first type comprises a gate conductor of superconductive material embraced by a control coil of a superconducting wire having a relatively high transition temperature. The control winding remains a superconductor at all times and, therefore, offers no resistance when a magnetic field of sufficient intensity is established by energizing the coil with current $I_c$ causing the gate conductor to assume the resistive state. For the single control coil type, the 0 and 1 designation or the Off and On designation used in FIGURES 1A through 1D indicates which of the binary states produces a flow of current through the gate conductor of the cryotron. The coil of the cryotron described above is of the full-select type as well as the coils for the other three types to be described below.

Where there is more than one control coil for a cryotron, the logical elements are distinguished by having one of the letters, A, B or C, appearing therewith. In FIGURE 3, the cryogenic elements 4 labeled A have two control coils arranged in aiding relationship such that when current flows in either coil separately or in both coils, the gate conductor is resistive or normally conductive; whereas, if current does not flow in either one or the other coil, the gate conductor is superconductive. This will be recognized as the OR function.

The cryogenic elements 6 labeled B have two control coils arranged in "bucking" relationship such that when current $I_c$ flows in both coils, the magnetic fields are cancelled to produce a zero magnetic field in effect which renders the gate conductor superconductive. However, if current flows in only one of the coils, the gate conductor is resistive. This will be recognized as the OR but NOT BOTH or Exclusive OR function.

The elements 8 labeled C have three coils, two of which are in aiding relationship and the third in "bucking" relationship with the other two. The two aiding coils have their four connections on the same side of the block and the bucking coil has its two connections on the other. The logical operation for C-type cryotrons is best explained by the following truth table wherein the normally conductive (NC) and superconductive (SC) status of the gate conductor are tabulated:

TYPE C CRYOTRON ELEMENT

| Current $I_c$ | | | Gate Conductor Status |
|---|---|---|---|
| Aiding | | Bucking | |
| Coil 1 | Coil 2 | Coil 3 | |
| On | On | On | NC |
| On | On | Off | NC |
| On | Off | On | SC |
| On | Off | Off | NC |
| Off | On | On | SC |
| Off | On | Off | NC |
| Off | Off | On | NC |
| Off | Off | Off | SC |

In FIGURES 1A through 1D the minus sign (—) at line terminations may be taken as a common ground although it is pointed out that it may be convenient to connect together all of these ground connections for the "One" or On side of the flip-flop pairs and similarly those for the "Zero" or Off side thereby providing for resetting all of the flip-flops to one or the other state by opening the appropriate ground connection. The plus signs (+) may designate separate current sources, each supplying the appropriate control current $I_c$, for switching one cryotron circuit. Some of these may be combined into a single source for those coils that always carry current as in the case of one of the aiding coils in the C-type cryotron element. In the instance of the current sources for the gate circuits of the Exit Pairs of the entry register and the Word portions of the storage registers wherein a common supply of magnitude $I_c$ is used for each bit position through all of these devices, this is sufficient because there is an exit from only one of these registers at one time which sets only one flip-flop per bit position in the receiving storage register. No superconducting circuit is supplied from this source during the non-operating portion of the cycle; hence, current flows in the normal conducting path, dividing between the several entry quads. In the case of all other sources, one or another superconducting path is always present.

Each bit position of each register comprises a set of six or eight cryotrons arranged in two columns of three or four rows. In each set, the top row for a set of six or the top two rows for a set of eight form an entry pair or quad respectively. The next row, as the case may be, forms a flip-flop storage pair and the bottom row forms an exit pair. In FIGURE 1A, for example, a six element set 10 is shown as the entry position for the Vacancy Bit. The top pair is the entry pair, the middle pair is the flip-flop storage pair, and the bottom pair is the exit pair. Supplying current $I_c$ to coil 12 makes a gate conductor 14 resistive. Gate current, $I_g$, flows through superconductive gate 16, through the One gate 18 (now superconductive) of the flip-flop pair, through control coil 20 of the Zero gate 22 of the flip-flop pair and through the control coil 24 of the 0 gate of the exit pair to the minus terminal or ground. The magnetic fields, once established, need no further energy for their support and the One bistable state is maintained. When $I_c$ is supplied to coil 26 of the 0 entry cryotron, the gate conductor 16 becomes resistive, current $I_c$ in coil 20 and coil 24 is reduced to $I_g$, and gate conductor 22 becomes superconductive. Thus, $I_g$ flows through gate conductor 14, gate conductor 22, and control coils 28 and 30 to ground and the flip-flop pair is maintained in the Zero state.

Consider now the eight element set of cryotrons immediately below the six element set 10 described above. This set is the Vacancy Bit position of the Word 1 register. The upper-most pair of elements are of type B, and current $I_c$ is continuously supplied to the coils 34 and 36. Accordingly, in the absence of $I_c$ in coils 38 and 40, gate conductors 42 and 44 are superconductive. The pair of elements in the next row comprises the second entry pair. When gate conductor 42 is superconductive and passes $I_g$, $I_c$ flows through control coil 46, making a gate conductor 48 resistive. When gate 44 is superconductive and passed $I_g$, $I_c$ flows through control coil 52, making gate 54 resistive. Immediately below the latter set is a flip-flop pair comprising cryotrons 55 and 56 cross-coupled for preserving the binary bit transferred by the entry quad. Finally, an exit pair is arranged to read-out the state of the flip-flop pair 55 and 56 by having current from one of the superconductive elements of the flip-flop pair applied as $I_c$ to one or the other of the control coils 57 and 58 of the exit element. For example, with the 0 gate of cryotron 56 superconductive, $I_c$ is supplied to coils 59 and 57 making their respective gates resistive.

In FIGURES 1A through 1D, sixteen cryotron sets are shown arranged in four columns (Tag Bit *t*, Tag Bit *l*, Data Bit *d*, and Data Bit *l*) and four rows (Entry Register, Word 1 Register, Word N Register, and Exit Register). The four columns are representative of tag plus data ($t+d$) bits. Tag bits $t$ and $l$ are shown as being the highest and lowest orders of the tag, and data bits $d$ and $l$ are shown as being the highest and lowest orders of the data word. Of the four rows of cryotrons sets shown, the two middle rows of sets are representative of the N words provided for in the Memory system, the upper middle row being the first word register (Word 1 Register) and the lower middle row being the last word register (Word N Register) in Memory. It is pointed out that the tag positions of the Word registers differ from the data positions by the inclusion in the former of additional circuits including B cryotrons which are used for control purposes to be described later.

Referring now to the Timing Signal set of cryotrons in FIGURE 1B, when the flip-flop pair comprising control coil 60 and gate conductor 62 and control coil 64 and gate conductor 66 are in the bistable state representing the OFF status, two current sources 70 and 72 have superconductive paths as follows: The source 70 passes through a gate 73 and supplies coils 74 and 76 of the Vacancy Bit Exit pair (type A) of the Entry Register and to the Entry Register Exit Control line 78 to suppress transfer of information from the Entry register into the Word registers. The second source 72 passes through a gate 79 and supplies the Exit Register Entry Control line 80 when the Timing Signal is OFF to suppress entry into Exit register. The Timing Signals are controlled by the computing system via the ON-OFF lines 82 and 84 respectively. Assuming that $I_c$ is supplied to the OFF line 84, coil 86 renders gate 88 resistive. Thus, $I_g$ flows through gate 90, gate 66, coil 60, coil 92 and coil 94 to ground. As described above, current sources 70 and 72 are effective to inhibit the Entry and Exit registers. To enter information into Memory, the Entry-Exit bit, the tag bits and the data bits are first stored in the Entry register. Then, the ON line 82 is fed by $I_c$ to render gate 90 resistive. Current $I_g$ now flows through gate 88, gate 62, control coil 64, control coil 98, and control coil 100 to ground. Thus, gates 73 and 79 become resistive to cut off the current sources 70 and 72 to Entry Register Exit Control line 78 and the Exit Register Entry Control line 80. Now, gate conductors 102 and 104 are superconductive and supply Timing Signals according to the status of the Entry-Exit cryotron set described below.

For entering information in Memory or extracting information from Memory, an Entry-Exit Control bit is employed where a Zero bit specifies an entry and a One bit specifies an exit from Memory. In FIGURE 1A, the Entry-Exit (EE) set is made operative to cause an Entry operation by the application of $I_c$ to control coil 108 which causes gate 110 to become resistive. Gate elements 112 and 114 are superconductive permitting $I_c$ to flow through coils 116 and 118 to establish the 0 state of the EE set. When the Timing Signal set is turned ON, current source 70 finds a superconductive path through the gate 102, a gate 122 to the Exit Register Entry Control line 80; and current source 72 finds a superconductive path through the gate 104, and a gate 126 to the Exit pair of the uppermost Echo Bit set via a line 128. This Echo Bit set is associated with the Vacancy Bit of the Word 1 register as shown.

For extracting information from Memory, a One bit is supplied to the EE set by applying $I_c$ to coil 130 making gate 112 resistive. The removal of current $I_c$ to coil 116 makes gate 132 superconductive. Thus, current through gate 110, gate 132, and control coils 134, 136 and 138 makes gates 122 and 126 resistive and thereby inhibits the flow of current in lines 80 and 128. Also, the resistivity of gates 112 and 114 permits gates 139 and 140 to become superconductive since coils 118 and 141 are not supplied with $I_c$. Now, current is directed from the Timing Signal set in the ON state through superconductive gate 139 to the Entry Register Exit Control line 78 and through the gate 140 to a Word Register Exit Control line 142.

The Vacancy Bit (VB) column of cryotron sets in FIGURES 1A and 1B comprises the VB set 10 previously described and a cryotron set for each register (Word 1 Register–Word N Register) but none for the Exit register. For instruction words dealing with movement of data into or out of the Memory system, there will be at least the following: An EE control bit, a Vacancy control bit (VB) and a group of $t$ tag bits. A Vacancy Bit of 0 is used to signify a vacant Word register, one available for receiving a data word with its tag, and a VB of 1 signifies that the contents of a register are not to be changed. More specifically, if a word is to be stored in Memory, a VB of 1 indicates that the Word register in which a word is to be entered will not be available, thereafter for the storage of subsequent words until released at a later time. For a read-out or exit instruction, the VB may be either a 0 or a 1. A VB of 0 signifies that after reading out the register addressed, the word is not needed for a subsequent exit; hence, the Word register addressed can be released from the occupied to the vacant state. A VB of 1 signifies that the word is to be retained for subsequent use.

Immediately to the left of the Vacancy Bit column of cryotron sets in FIGURES 1A and 1B is a column of cryotron sets labeled Echo Bit (EB), one set for each Word register, which will normally echo the status of the VB flip-flop associated therewith. However, during an entry or exit operation affecting a particular Word register, each Echo set is temporarily suppressed by a toggle through operation of type A cryotrons 150 and 152 to be described later. This is necessary because a new VB of 1 replacing the old VB of 0 should not become effective at once and thereby interfere with the presently operating selection of the vacant Word register.

Consider the storage of a word in Memory, which it will be assumed is completely empty. The Word including Vacancy indicator Data and Tag are made available to the inputs of the Entry register; for example, let $t$=01 and $d$=10. A Vacancy Bit of One is used to signify that the Word register to be used will not be available subsequently for storage of another word, and an Entry-Exit bit of Zero is used to cause an entry operation. Thus, the EE coil 108, and the VB coil 12 are driven with $I_c$ in FIGURE 1A. In the Entry register, TB$t$ coil 106 receives $I_c$ indicating a Zero, TB$l$ coil 162 receives $I_c$ indicating a One, DB$d$ coil 164 receives $I_c$ indicating a One and DB1 coil 166 receives $I_c$ indicating a Zero. Without additional activation, the flip-flops of the Entry register assume the appropriate states, but the Exit pairs of the Entry register prohibit transfer of the information into the Data registers in the following manner: With the Timing Signal set OFF, the current from source 70 passes through gate 73, control coils 74 and 76, Entry Register Exit Control line 78, and Exit coils 170, 172, 174, 176, 178, 180, 182, and 184 to ground. As stated previously, a Zero is entered in the EE set making the Zero gate 114 of the flip-flop pair superconductive and the One gates 132 and 139 resistive. In turn, Zero gates 122 and 126 are made superconductive.. Upon occurrence of the ON Timing Signal, ON gate 62 of the TS flip-flop becomes superconductive causing gates 66, 73 and 79 to become resistive. ON gates 102 and 104 are now superconductive and supply current from sources 70 and 72 to the EE set where 0 gates 122 and 126 pass current to the Exit Register Entry Control line 80 and the Echo Bit Control line 128 respectively. Since gates 139 and 140 of the EE set and gate 73 of the TS set are resistive, $I_c$ no longer flows in coils 74 and 76 of VB set 10, Entry Register Exit Control line 78 and Word Register Exit Control line 142. The EB sets continue to reflect the status of their associated VB sets and, accordingly, are in the Zero state permitting $I_c$ on line 128 to flow through a 0 gate 190, control coil 192 of A-type cryotron 150, control coil 194 of a C-type cryotron 196, Word 1 Register Entry Control line 198 and to terminal 199 via control coils 210, 212, 214, 216, 218, 220, 222 and 224 in series of B-type Entry cryotrons.

It is important that this new VB 1 replacing the old VB 0 should not become operative immediately and interfere with the presently operating selection of the Word 1 Register as the first vacant Word register. As stated previously, the EB flip-flop, which controls the selection, normally echoes the contents of the VB flip-flop. However, during an Entry operation such as this or an Exit operation, the echo circuit is temporarily suppressed by operation of the A-type cryotrons 150 and 152. Either a Word 1 Register Entry Control signal on the line 198 or a Word 1 Register Exit Control signal on a line 200 through the upper coil of A cryotron 150 operate this suppression circuit. This same toggle 150 inhibits the Word 1 Register Entry pair for the Vacancy Bit when either the Word 1 Register Entry or Exit Control signal is provided. As explained later, when the Timing Signal is OFF the contents of the VB flip-flop of Word 1 Register is placed in the Echo flip-flop of the Word 1 Register.

By way of review, in the Entry register, the VB flip-flop indicates a 1, TB*t* flip-flop a 0, TB*l* flip-flop a 1, DB*d* flip-flop a 1 and DB*l* flip-flop a 0. In the absence of $I_c$ on Entry Register Exit Control line 78, Entry Register Exit gates 201, 202, 204 and 206 are superconductive to reflect the status of their respective flip-flops. In the absence of $I_c$ to control coils 74 and 76 of Vacancy Bit set 10 of the Entry Register, gate 207 is superconductive to indicate the 1 state of the VB flip-flop. $I_c$ in Word 1 Register Entry Control line 198 flows through Entry Control coils 210, 212, 214, 216, 218, 220, 222 and 224 and overcomes the bias supplied by bucking control coils 226, 228, 230, 232, 234, 236 and 240 of these B-type cryotrons. Entry gates 242, 244, 246, 248, 250, 252, 254 and 256 become superconductive and permit the bits stored in the Entry Register flip-flops to be set into the flip-flops of Word 1 register. For example, $I_c$ flows through TB*t* Exit gate 201, Word 1 Register Entry gate 242 and a control coil 260. Thus, 1 gate 262 becomes resistive and 0 gate 264 becomes superconductive causing the 0 gate 266 of the TB*t* position flip-flop of the Word 1 Register to be superconductive. In the same manner, Tag Bit *l*, Data Bit *d* and Data Bit *l* are entered in the Word 1 Register.

Refer now to the C-type cryotron 196 in FIGURE 1A, a circuit exists from the negative terminal through an aiding coil 270, an aiding coil 271 of cryotron 150, Word 1 Register Exit Control line 200, C-type Exit coils 272, 274, 276, 278, 280, 282, 284, 286, a gate 290 of B-type cryotron, a gate 292 of B-type cryotron to the Word Register Exit Control line 142. An identical parallel circuit is provided for Word N Register to line 142. As stated before, superconductive current does not flow in line 142 because the 1 gate 140 of the EE set is resistive; therefore, $I_c$ does not flow in coil 270 of the C-type cryotron 196 with the result that control current in coil 194 cancels the effect of the bucking coil, which is continuously biased, thereby rendering gate 294 superconductive. The gate 294 passes $I_c$ to control coils 40 and 38 which provide magnetic fields in opposition to those supplied by the bias coils 34 and 36. $I_c$ then flows through gate 207, gate 44 and coil 52 to cause cryotron 55 to assume the superconductive state indicative of One.

Word 1 register is now storing the information provided to the Entry Register except that the associated Echo set remains in the 0 state. When the Timing Signal is turned OFF by application of $I_c$ to terminal 82, gates 102 and 105 become resistive and gates 73 and 79 superconductive. The status of the EE set is immaterial when the Timing Signal is OFF since current source 70 supplies VB coils 74 and 76 and Entry Register Exit Control line 78 and since current source 72 supplies the Exit Register Entry Control line 80. Because gate 104 of the TS set is resistive, control current is no longer supplied to line 128 via gate 126 of the EE exit pair and although gate 190 of the Echo set is supperconductive, control current to coils 192 and 194 of toggles 150 and 196 is not provided. Further, Word Register Exit Control line 142 no longer supplies control current to the Word 1 Register Exit Control line 200 via the Word registers. Under these conditions coils 192 and 272 are not energized, current passes through a gate 301 of cryotron 150, through an exit gate 303 (superconductive due to the VB Word 1 flip-flop being set to 1) and through a control coil 305. The 0 Entry gate 307 becomes resistive and current is switched into gate 309, gate 311, coil 313 and coil 315. The Echo Bit flip-flop is now set to One.

Referring now to the C-type cryotron 196 of the toggle pair, neither control coil 194 nor control coil 270 are provided with control current. Thus, the bucking coil makes gate 294 resistive thereby cutting off $I_c$ to coils 38 and 40. This latter action leaves gates 42 and 44 under control of constantly-biased coils 34 and 36 which makes these gates resistive.

An important feature of the invention as stated in the objects is that the word to be entered in Memory is always entered in the first vacant word register. It should now be apparent that this is accomplished by the Echo Bit sets. Reflecting upon the Entry operation described above, the Entry operation was specified by an EE bit of 0 which then provided a path from current source 72, through ON gate 104, 0 gate 126, line 128, 0 gate 190, coils 192 and 194, Word 1 Register Entry Control line 198 and so forth. At present, the Echo Bit set associated with the Word 1 register contains a One rather than a Zero so that the control current, if supplied, through line 128 is blocked from passing through 0 gate 190 and on to the toggle pair, Tag Bit sets and Data Bit sets of the Word 1 register.

The foregoing operation is best illustrated by another Entry operation which, in turn, leads to a description of another important feature of the invention. It is now assumed that the Entry Register is provided with an EE bit of 0, a Vacancy bit of 1, TB*t* of 1, TB*l* of 0, DB*d* of 0 and DB*l* of 1. Thus, Entry Control coils 108, 12, 273, 275, 277 and 279 receive $I_c$ and immediately corresponding flip-flops of the Entry Register are set to these values.

In the manner previously described, the Exit sets of the Entry Register are inhibited by the Timing Signal being OFF. When the Timing Signal is turned ON, current from source 70 passes through ON gate 102, 0 gate 122 and Exit Register Entry Control line 80, and current from source 72 passes through gate 104, gate 126, line 128, an EB*l* gate 300, and EB N gate 302, a control coil 304 of cryotron 152, a control coil 306 of a cryotron 308, a Word N register Entry Control line 310, TB*t* coils 312 and 314, TB*l* coils 316 and 318, DB*d* coils 320 and 322 and DB*l* coils 324 and 326 to ground. The effect of $I_c$ in coil 306 of toggle 308 is to overcome the field of a biased coil 330 since coil 332 is not energized (recall that line 80 is carrying only normal current). Thus, a gate 334 is superconductive and supplies $I_c$ to control coils 336 and 338. The effect of bucking coils 340 and 342 is overcome by the latter and now VB*l* of the Entry Register is transferred to the Word N register via gate 207, a gate 344, and a control coil 346. Gate 348 becomes resistive and a gate 349 superconductive with the accompanying storage of 1 in the VB flip-flop of the Word N register. The Entry Register Exit Control line 78 is not supplying control current to the Exit coils 170, 172, 174, 176, 178, 180, 182 and 184 of the Entry register so that Exit gates 352, 354, 356 and 358 are superconductive. The Word N Register Entry Control line 310 is superconductive as explained above, and the control current supplied therefrom to coils of B-type cryotrons overcomes the effect of bias coils 362, 364, 366, 368, 370, 372, 374 and 376. The transfer of tag and data information from the Entry register to the Word N register now takes place. In TB*t* position, control current flows through gate 352, a gate 380, and coil 382. $I_c$ flows through 1 gate 384, coil 386, gate 388, coil 390 and coil 392 setting the flip-flop to One. In the TB 1 position, control current flows through gate 354, a gate 394 and a coil 296. $I_c$ flows through a gate 398, 0 gate 400, a coil 402, and a coil 404 setting the flip-flop to Zero. In the DB*d* position, current flows through gate 365, a gate 406 and a coil 408. Gate 410 is superconductive and supplies current to gate 412, a coil 414 and a coil 416 setting a Zero in the flip-flop. In the DB*l* position, current flows through gate 358, a gate 418 and a coil 420. Gate 422 becomes resistive, and a gate 424 superconductive so that current flows through a gate 426, a coil 428 and a coil 430 setting a One in the flip-flop.

When the Timing Signal goes OFF, current from source 72 through gate 104, gate 126, gate 300, gate 302, control coil 304, control coil 306, line 310 and so forth is reduced to normal current. Besides blocking the Entry of the Word N register, the VB is entered in the Echo set via a gate 434 of toggle 152, a gate 336 and a control coil 338. 0 gate 341 becomes resistive and 1 gate 342 superconductive to set a 1 bit in the EB flip-flop of the Word N register.

While only two storage positions have been illustrated in the interest of brevity, the Memory may include a very large number of positions suitable for the computing system employed and the applications for which it is intended. If the capacity of Memory is exceeded, this fact should be known so that an adjustment may be made such as switching to another Memory unit. Since the Memory is now shown to be full having words stored in positions 1 and N, operation of the Vacancy Signal will be explained.

For an Entry operation, the EE set always switches the source 72 into the Echo Bit column when the Timing Signal is ON. The Echo Bit positions indicate a loaded location in Memory by a One and a vacant location by a Zero. Presently, each EB flip-flop registers a One, and upon occurrence of Timing Signal ON, current is switched through gate 104, gate 126, gate 300, gate 544, a control coil 546 and a control coil 548. Vacancy cryotron 550 of the single coil type has its gate 552 superconductive in the absence of $I_c$ in coil 546, and thus, if any EB positions contain Zeros, superconductive current flows from a terminal 554 to indicate a vacancy. In this instance of a full Memory, both coils 546 and 548 are energized and the latter opposes the field of a bucking coil 556 to make a gate 558 of No Vacancy cryotron 560 superconductive. Accordingly, superconductive current at terminal 562 indicated No Vacancy.

Additionally, notice that a word may be stored in the Entry Register for transfer into Memory upon the occurrence of the Timing Signal ON which provided the No Vacancy signal; however, EB Exit gates 190 and 302 are resistive to prohibit operation of Word 1 and Word N Register Entry Control lines 198 and 310.

Reading from Memory is accomplished without regard for location but rather by location of the tag associated with the data. It follows that a tag must be specified to retrieve a word and this implies that a comparison be effected between the specified tag and each tag located in Memory. A serial comparison would be time consuming and impose some instruction on programming and, accordingly, in the present invention, comparison is made in a parallel fashion in a predetermined time regardless of the location of the specified tag Memory.

Attention is now directed to FIGURES 1A and 1B where the TB*t* column of sets is shown. Starting with the Entry set, a One stored therein provides a superconductive path through a gate 564, a coil 566 of a cryotron 567, a coil 568 of a cryotron 569, a gate 570, a coil 572 and a coil 574. Taking the cryotron 569 as one example of the function of similarly connected B-type cryotrons, a coil 576 is coupled in the circuit of the TB*t* set for the Word 1 Register which now contains a Zero. Thus, the 1 gate 262 is resistive and $I_c$ is prevented from flowing through coil 576. Since B-type cryotrons perform the Exclusive OR function, gate 292 is resistive indicating a mismatch between the tag bit in the Entry register and the tag bit in the Word 1 register. It is obvious that a Zero stored in the TB*t* flip-flop of the Entry Register prohibits $I_c$ from flowing in coil 568 and gate 292 becomes superconductive indicating a match. Turning to the cryotron 567 immediately below the one just referred to, the coil 586 is energized due to 1 gates 584 and 588 being superconductive. The coils 566 and 586 setting up opposing fields permit a gate 590 to become superconductive indicating a match. It is pointed out again that a branch of the Word Register Exit Control line 142 exists through gates 292 and 290 and if both gates are superconductive indicating a match of tags, control current is passed to the control coils of the Exit pairs of the Word 1 Register to the Word 1 Register Exit Control line 200. It suffices to say at this time that such a condition prepares Word 1 Register for reading into the Exit Register.

The next example is directed to an Exit operation with the assumption that Memory is loaded as described previously. The EE bit must be a 1, the VB is chosen to be a 1 (the information is to be extracted again for a subsequent operation), and the tag is taken to be 01. The EE coil 130 is energized and gates 110 and 132 become superconductive thereby causing gates 114, 122 and 126 to be resistive. Gates 139 and 140 become superconductive to control the Exit operation when initiated by the Timing Signal. In the VB Entry set, the coil 12 is energized, a One set in the flip-flop and the Exit pair is inhibited by current in coils 74 and 76 until the Timing Signal comes ON. The tag is stored in the tag portion of the Entry Register by energizing coil 160 and coil 162. It is pointed out that the Entry Register Exit Control line 78 carries control current prior to and during an Exit operation so that the Tag Bit and Data Bit Exit pairs of the Entry Register are continuously inhibited and data bits, if present, cannot be entered in Memory. Further, communication between Tag portion of the Entry Register and the Tag portion of the Word Registers is effected only via B-type cryotrons 569, 591, 567 and 592.

When the Timing Signal comes ON, control current flows from source 70 through gate 102, gate 139 to the Entry Register Exit Control line 78, the latter having been previously supplied by source 70 through gate 73 and coils 74 and 76. Control current is also supplied from source 72 to SC gate 104, SC gate 140 and Word Register Exit Control line 142. At this point, examine the status of the B-type cryotrons which effect the comparison of tags. The TB*t* Entry Register flip-flop contains a Zero making gates 564 and 570 resistive and control current is not supplied to coils 566 and 568. The TB*t* Word 1 flip-flop contains a Zero and gate 262 and a gate 394 are resistive. Control current is not supplied to either coil 568 or 576 so gate 292 is superconductive. The TB*t* Word N flip-flop contains a One and gates 584 and 588 supply control current to coil 586. Thus, gate 590 is resistive and blocks current from line 142. The TB1 Entry Register flip-flop contains a One making a gate 600 and a gate 602 superconductive for passage of control current to a coil 604 of cryotron 592 and a coil 606 of cryotron 590. Since TB1 flip-flop of the Word 1 Register is storing a One, gates 608 and 610 are superconductive providing control current to a coil 612 of cryotron 590. Both control coils 606 and 612 are energized and gate 590 becomes superconductive. Now, control current passes from the Word Register Exit Control line 142 through gate 292, gate 290, control coils 286, 284, 282, 280, 278, 276, 274 and 272, Word 1 Register Exit Control line 200, coil 271 and coil 270 to ground. The effect of energizing control coil 270 of cryotron 196 is to pass current through gate 294 to coils 40 and 38 which make receptive the VB set of Word 1 Register. Since the Vacancy Bit of the Entry Register is a 1 there is no transfer since a 1 is already stored. The effect of energizing coil 271 is to delay transfer of the VB to the Echo set, but in this instance, the Echo Bit set for the Word 1 Register already contains a One.

Returning now to the tag and data sets of the Word 1 Register, the effect of directing current from Word Register Exit Control line 142 through gates 292 and 290 and control coils of the Exit pairs to the Word 1 Register Exit Control line 200 is to read out the Word selected by the comparison of tags. C-type Exit cryotrons 620, 622, 624 and 626 reflect the status of their flip-flops when coils 274, 276, 280 and 286 respectively are energized since these bucking coils overcome the biasing of coils 630, 632, 634 and 636. In this regard note that the remaining aiding coils of these C-type cryotrons are not provided with control current. The Exit Register Entry Control line 80 does not carry control current due to the states of the Timing Signal set so the Entry cryotrons of the Exit Register are receptive. Starting with the TB*t* set of the Word 1 Register, current flows through a gate 642 of cryotron 620, a line 644, a line 646 and downwardly to and through a gate 648 and a control coil 650 thereby setting the TB*t* Exit Register flip-flop to 0. In like manner, TB*l*, DB*d* and DB*l* are read from the Word 1 Register into the Exit Register.

The Vacancy Bit of the Word 1 Register continues to store a 1 and there is still "no vacancy" in Memory. However, if a VB of 0 had been stored in the example given above, readout would have been accomplished as described, the Word 1 Register would continue to store the information, and the Vacancy Bit and Echo Bit sets would be in the Zero status. The result would be that for a subsequent Entry operation current source 72 would supply gates 104 and 126, line 128, gate 190, and the Word 1 Register Entry Control line 198. New information would replace the contents of the Word 1 Register. Of course, with EB gate 300 resistive the Vacancy Signal would indicate a vacancy since gate 552 would be superconductive.

The programmer may wish to set a Vacancy bit to One and continue to use the associated word thereby avoiding erasing the word when the routine is completed. This is permissible if there are vacant word registers available for receiving information which would otherwise interfere with a location having a VB of Zero. Thus, an important feature resides in changing the Vacancy bit which may be considered a portion of the tag address.

For purposes of explanation, the tag and data were referred to separately, but it is pointed out that the tag may be a portion of the data and that a word of information includes the Vacancy bit, tag and data.

While superconductive logical elements have been employed in the illustration of the invention, it will be recognized that other logical devices such as relay and magnetic core circuits may be substituted. Further, thin film cryotrons are equivalent and their use is contemplated.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for storing information comprising a plurality of storage registers for storing a plurality of information words, means for entering an information word in any selected storage register, availability indicating means associated with each storage register for indicating whether or not it is available for storage of an information word, means for interrogating said availability means and for selecting a register only in response to a predetermined indication of its associated availability indicating means, means for reading the information stored in any selected register, means responsive to said reading means for conditioning the availability indicating means associated with said selected register for alteration, and selectively operable means for altering the state of any availability indicating means which is conditioned for alteration.

2. Apparatus for storage of information including status data comprising a plurality of information storage locations each including an information storage register accompanied by a status data storage register, means for entering information and status data in any selected storage location, entry control means associated with each said information storage register, and its accompanying status data storage register selectively operable to condition the associated registers for entry of information and status data, status indicating means associated with each status data register and having conditions representing availability and non-availability of the associated information storage register, means for conditioning said indicating means in accordance with data stored in said status storage register, means for interrogating the status indicating means and responsive only to an availability representing condition in one of said indicating means to operate the entry control means of the associated information and status data storage registers to condition them for entry of information, and means for inhibiting the means for conditioning said indicating means during operation of the entry control means to preserve the previous status condition until the entry of new information and status data is completed.

3. In an information storage system including a plurality of storage registers for storing information including status data, means responsive to stored status data for selecting a register comprising entry control means associated with each register, signal steering means associated with each register, said signal steering means being connected in a series circuit, control means for applying a signal to said series circuit, means for conditioning each said steering means in accordance with status data stored in the associated register, said conditioning means being operable to cause said steering means to divert said signal to the entry control means of the associated register only when the status data indicates availability of the register, and means coupled to said series circuit for providing an indication if no steering means diverts said signal.

4. In an information storage system, an information storage register including at least one information storage device and a status data storage device, said storage devices each including data entry control means, means for entering information and status data in said storage devices when said data entry control means are operated by a control signal, signal steering means associated with said status data storage device for steering an applied signal to said entry means or to an output, means for conditioning said steering means in accordance with status data stored in said status data storage device, control means electively operable for applying a signal to said steering means, said steering means applying said control signal to said data entry control means only in response to predetermined data in said status data storage device, and means responsive to application of said control signal to said entry control means for inhibiting the means for conditioning said steering means to prevent conditioning of said steering means in accordance with status data being entered.

5. In an information storage system, an information storage register including at least one information storage device and a status data storage device, said storage devices each including data entry control means and said information storage device including data exit control means, control means for selectively operating said data exit control means to condition said information storage device for readout, and means responsive to said control means for operating the data entry control means of said status data storage device to condition the same for entry of new status data upon readout of said information storage device.

6. A superconductive logical circuit comprising a conductor having critical temperature and magnetic field transistions between resistive and superconductive states, means for maintaining said conductor at a temperature such that the conductor is normally superconductive, a first magnetic field producing coil associated with said conductor operable when energized to produce a magnetic field to the conductor sufficient to render it resistive, and a second magnetic field producing coil associated with said conductor and said first coil, said second coil being poled in opposition to the first coil and operable when energized coincidently with the first coil to cancel the effect of the first coil and thereby maintain said conductor in the superconducting state.

7. A superconductive comparator for providing a signal when two bistable devices are in identical stable states comprising a conductor having critical temperature and magnetic field transition thresholds between resistive and superconductive states, means for maintaining said conductor at a temperature such that it is normally superconductive, first and second magnetic field producing coils associated with said conductor, each said coil producing when energized a field sufficient to render the conductor resistive, said coils being poled in opposition to one another so that their effects are mutually cancelling when they are energized simultaneously, means for energizing said first coil when an associated bistable device is in a predetermined one of its stable states, means for energizing said second coil when an associated bistable device is in the same predetermined one of its states, means including a current souce for interrogating said conductor and indicating when it is superconductive.

8. A superconductive logical circuit comprising a conductor having critical temperature and magnetic field transitions between resistive and superconductive states, means for maintaining said conductor at a temperature such that the conductor is normally superconductive, first, second and third magnetic field producing coils associated with said conductor each of which produces when energized a field sufficient to render the conductor resistive, said third coil being poled in opposition to the other two and cancelling the effect of one of said other two when energized coincidently therewith.

9. The invention defined in claim 8 wherein said first coil is continuously energized and wherein said second coil and said third coil are selectively energized by control pulses, the conductor being maintained superconductive only when a control pulse is applied to the third coil in the absence of application of a control pulse to said second coil.

10. The invention defined in claim 8 wherein the third coil is continuously energized and the first and second coils are selectively energized by control pulses, the conductor being maintained superconductive only when control pulses are coincidently applied to said first and second coils.

11. Apparatus for the storage of information comprising a plurality of information storage locations each capable of storing information signals and identification signals, means for reading a selected one of said storage locations, means responsive to said last named means for conditioning at least a part of the identification signals stored in the said selected location for alteration, and selectively operable means for altering identification signals which are conditioned for alteration.

12. Storage apparatus comprising:
(a) a plurality of portions of storage, including information storage means and means for storing availability data respecting its related portion of storage;
(b) means for selecting portions of storage on the basis of at least a portion of their information content;
(c) means for applying a control signal to said availability storing means to read the same;
(d) means responsive to said availability data for steering said control signal to a portion of storage; and
(e) means responsive to said control signal for entering information including availability data into said portion.

13. Storage apparatus comprising:
(a) a plurality of portions of storage;
(b) means for determining the availability of a portion of storage;
(c) means for entering information into said available portion; and
(d) means for identifying information on the basis of at least a portion of its contents and for selectively modifying the availability data included in said identified information.

14. A memory system comprising:
(a) a plurality of sets of registers for corresponding vacancy, tag and data infomation;
(b) input means for the memory for applying thereto signals representative of the value of information;
(c) means associated with each of said sets of registers and responsive to said vacancy information for indicating the status of the set of registers, each of said sets of registers including read-in means coupled to said input means and controllable by said indicating means for reading the information from said input means to an available register.

15. A memory system comprising:
(a) a plurality of sets of tag register, word register and vacancy register;
(b) input means for the memory for applying thereto signals representative of the value of information words, corresponding tag words and at least one vacancy bit;
(c) selection means included in said vacancy registers, responsive to an interrogation signal in accordance with whether or not a vacancy bit is stored in the registers, for selecting an available word register;
(d) read-in means included in said word register and responsive to said interrogation signal for reading in the information word into the selected word register.

16. A memory system comprising:
(a) a set of related tag register, word register and vacancy register;
(b) input means for said memory for applying thereto signals representative of the values of information words, corresponding tag words and vacancy data;
(c) said input means including means for controlling said set of registers so that an information word is stored in said word register, a corresponding tag word is stored in said tag register, and vacancy data is stored in said vacancy register only if the prior status of said vacancy register indicated that said set of word, tag and vacancy registers is available;
(d) means for applying to the tag register of said set of tag register, word register and vacancy register signals representative of vacancy data;
(e) means, included in said tag register, responsive to said interrogation signals for indicating whether or not the tag word represented by said interrogation signals is stored in the tag register;
(f) read-out means, included in said word register, controllable by said means responsive to said interrogation signals and operable upon indication that the tag word represented by the interrogation signals is stored in the tag register, for reading out the information word corresponding to that tag word from the word register; and
(g) means, included in said vacancy register, controllable by said means responsive to said interrogation signals and operable upon indication that the tag word represented by the interrogation signals is stored in the tag register, for entering said new vacancy data in said vacancy register.

17. Apparatus for the storage of information comprising:
(a) a plurality of locations, each capable of storing information signals and identification signals including vacancy signals,
(b) means for producing control signals, (c) reading and writing means associated with said locations, (d) means responsive to said vacancy signals for operating said writing means, and (e) means responsive to said control signals and identification signals for operating said reading means and selectively altering said identification signals.

18. Apparatus for the storage of information including vacancy data comprising:

(a) means delaying storage of current vacancy data, (b) means responsive to stored vacancy data for applying a control signal to a portion of storage, (c) means responsive to said control signal for entering information in said portion, and (d) means for selecting portions of storage.

References Cited by the Examiner

UNITED STATES PATENTS

| | | | |
|---|---|---|---|
| 2,549,071 | 4/1951 | Dusek | 340—174.13 |
| 2,885,659 | 5/1959 | Spielberg | 340—172.5 |
| 2,930,028 | 3/1960 | Johnson | 340—172.5 |
| 2,966,598 | 12/1960 | Mackay | 307—88.5 |
| 2,976,296 | 1/1961 | Chien | 340—172.5 |
| 3,018,956 | 1/1962 | Hosier | 340—172 |
| 3,032,746 | 5/1962 | Kautz | 340—172.5 |
| 3,093,814 | 6/1963 | Wagner | 340—172.5 |

ROBERT C. BAILEY, *Primary Examiner.*

EVERETT R. REYNOLDS, MALCOLM A. MORRISON, IRVING L. SRAGOW, *Examiners.*